Figure 3:
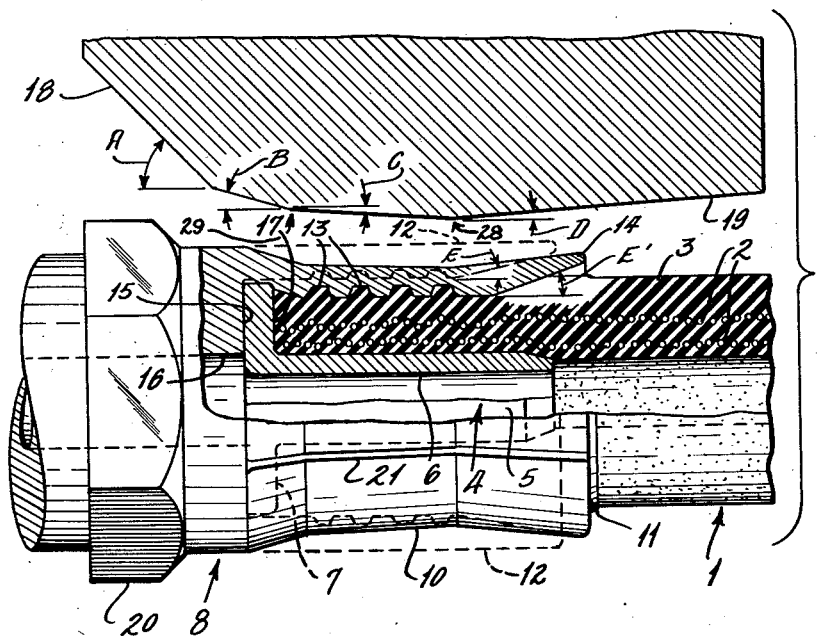

June 11, 1957 K. W. KLINKSIEK ET AL 2,795,041
METHOD OF MAKING A HOSE FITTING
Original Filed April 29, 1950 2 Sheets-Sheet 1
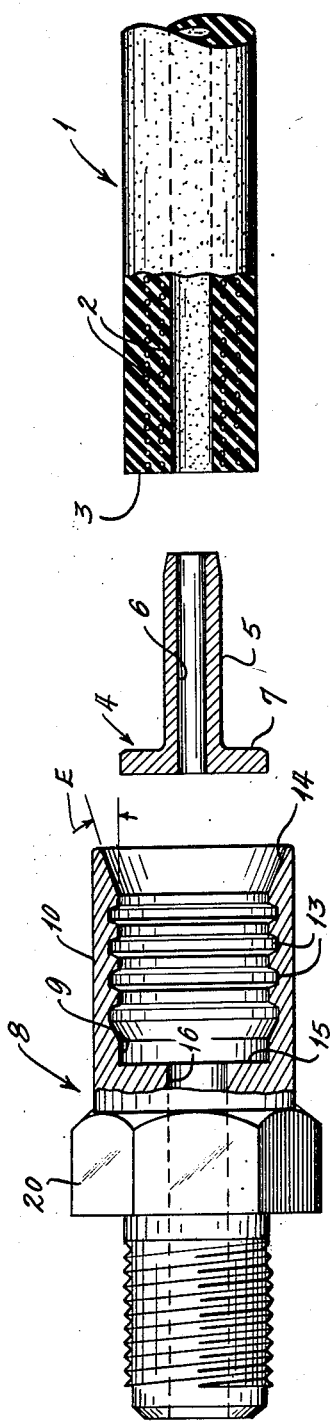
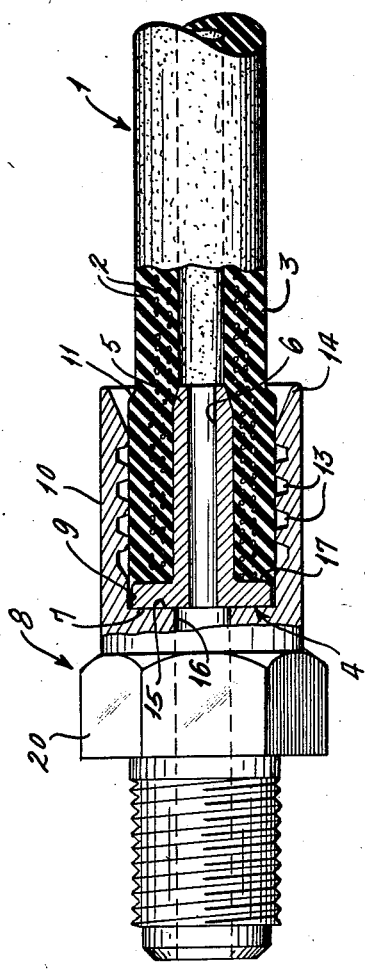
INVENTORS:
KARL W. KLINKSIEK
& ALBERT BRUNNER,
By Gravely, Lieder, Woodruff & Wiles
ATTORNEYS.

INVENTORS:
KARL W. KLINKSIEK
& ALBERT BRUNNER,
By Gravely, Lieder, Woodruff & Wills
ATTORNEYS.

United States Patent Office 2,795,041
Patented June 11, 1957

2,795,041

METHOD OF MAKING A HOSE FITTING

Karl W. Klinksiek, Richmond Heights, and Albert Brunner, Jennings, Mo., assignors to Wagner Electric Corporation, St. Louis, Mo., a corporation of Delaware Continuation of abandoned application Serial No. 159,082, April 29, 1950. This application March 17, 1954, Serial No. 416,909

4 Claims. (Cl. 29—508)

This application is a continuation of our co-pending application Serial No. 159,082, filed April 29, 1950, now abandoned.

This invention relates to a hose fitting or coupling and the method of making said fitting or coupling.

The application of flexible hose to devices in which relative motion between the parts thereof is necessary and between which it is necessary to transmit a fluid under pressure has been of major importance to the manufacturing industry for many years. To this end many means for coupling the ends of the hose to the source and load of the fluid pressure system have been devised. Fittings have been designed with flared end portions which prevent cutting or chafing of the hose thereon. The difficulty with the use of flared end portions in the past has been that said portions split or crack because the flare has been uncontrolled and allowed to exceed the free or normal diameter of the fitting prior to the flaring operation. Thus, it became necessary to use expensive highly ductile materials for the fittings to prevent splitting.

The principal object of the present invention is to provide a hose fitting which has a flared end portion which can be produced economically by machine in quantity and by using ordinary easily machinable materials as distinguished from the previous use of expensive highly ductile materials.

Another object is to provide an internal slope to the flared end portion of a hose fitting so as to allow a long life to fluid pressure hose secured therein even under extreme conditions of vibration.

Another object of this invention is to produce a hose fitting which can be applied to a pressure hose in which the preapplication shape of the fitting is designed to produce a fitting of the desired contour after application to the hose.

Another object is to produce a fitting which can be applied to a pressure hose by means of a multiple jawed die of the so-called tire setter type.

Still another object is to produce a hose fitting in which all parts, which are worked during the application thereof to a presure hose, are reduced in diameter.

Another object is to provide a fitting shaped so that it firmly grasps and seats a nipple previously placed within the fluid pressure hose.

These and other objects and advantages will become apparent hereinafter.

The invention comprises a hose fitting having a flared and portion whose outside diameter is substantially the same as or smaller than its initial diameter prior to the application of a hose, and in the method of producing same.

Figure 4:
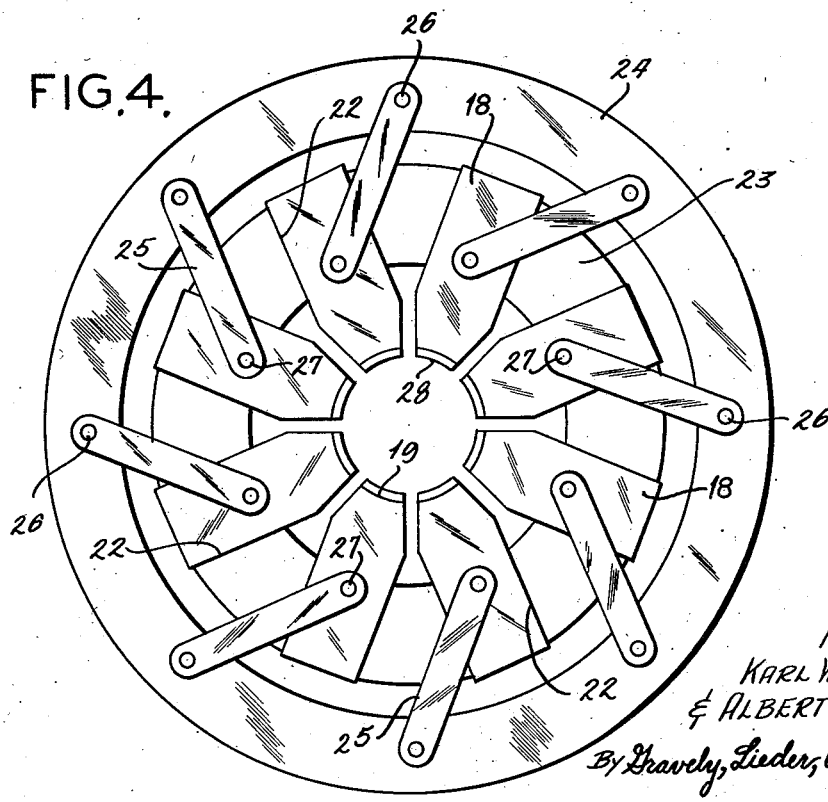

The invention also consists in the process and in the parts and in the arrangements and combinations of parts hereinafter described and claimed. In the accompanying drawings which form part of this specification and wherein like numerals refer to like parts wherever they occur:

Fig. 1 is an exploded view of the parts comprising the hose fitting assembly,

Fig. 2 is a partial cross-sectional view of a hose fitting assembly prior to the forming operation, Fig. 3 is an enlarged side elevational, quarter cross-sectional view of a hose fitting applied to a pressure fluid hose showing a cross-sectional view of a die jaw after it has formed the fitting into the shape shown from the original shape shown in dotted lines, and Fig. 4 shows an end view of a tire setter type machine such as is used to apply the hose fitting to the pressure fluid hose.

Referring now to Fig. 1, the pressure hose 1 comprises concentric woven fiber tubes 2 around which and between which is a vulcanized processed rubber compound 3. A nipple 4 having a nipple neck 5 with a nipple bore 6 therethrough and a head or flanged end 7 is provided for insertion into the end of said hose 1 to act as a support for the resilient material of the hose 1 during and after the application of said hose to a fitting or coupling 8. This operation swells the outside diameter of that part of the hose which contains the nipple 4. The end of the hose 1 is then ground to a diameter substantially equal to the internal bore 9 of tubular extension 10 of the fitting 8 which will cover the hose 1 from the end thereof to the point 11, Fig. 2, which is sufficient to insure a proper coupling.

The fitting 8, Fig. 1, is machined in any suitable way such as by an automatic screw machine to form as shown. The critical parts of this machining operation are the grooves or serrations 13 in the internal bore 9 of the tubular extension 10 and tapered wall 14 of the end of said tubular extension 10. A bottom surface 15 of the fitting 8 is machined smooth and has a hole 16 drilled therein for the passage of pressure fluid from the hose 1 through the nipple bore 6 in the nipple 4 to the receiving member (not shown). The flanged end 7 of the nipple 4 has a diameter only slightly less than that of the internal bore 9 of the tubular extension 10 of the fitting 8 to facilitate the sealing of the pressure fluid within the assembly when the fitting is formed into its final shape. The nipple neck 5 of the nipple 4 is so designed that its length is such as to support the hose 1 throughout the length that is compressed in the application of the tubular extension 10 of the fitting 8 thereto. While the exterior of the nipple neck 5 is shown to be cylindrical in form, it is usual to provide circularly oriented grooves thereon to increase the resistance to mechanically pulling the hose 1 from the fitting 8. The outside mean diameter of the neck 5 of the nipple 4 is made such that when it is forced into the bore of the hose 1 it makes a tight seal after assembly is completed to prevent the creepage of fluid along the outside of the neck 5 of the nipple 4 thence along the back 17 of the flanged end 7 and thence along the outside of the hose 1 under the fitting 8 to the atmosphere.

Having assembled the nipple 4 into the end of the hose 1, the assembly is then inserted into the internal bore 9 of the hose fitting 8 as shown in Figure 2. The partially assembled hose 1 and fitting 8 is then placed in the tire setter machine (shown in Figure 4) and formed into its final conformation by the closing in radially of the dies 18.

The configuration of the face 19, Figures 3 and 4, of each of the dies 18 is carefully designed to produce the desired pressure in the proper direction to give the greatest strength between the hose 1 and the fitting 8 after said fitting has been formed. A fragmentary radial cross-sectional view of a die 18 is shown in Figure 3 and an end view of the dies is shown in Figure 4. The length of the die 18 is sufficient to give the necessary contact with the fitting 8 and extend beyond the ends of the worked part thereof. The angle A, Figure 3, is machined on the die to allow clearance between the die 18 and the hexagonal part 20 of the fitting 8 and therefore is not critical. The angle B is dimensioned to cause a reducing operation at a point on the outer surface of the fitting 8 immediately to the right of the bottom surface 15 of the fitting 8 thereof and extend to a point substantially opposite the left edge of the innermost groove 13. This portion of the die 18 forces the metal of the fitting 8 around the head or flanged end 7 of the nipple 4 to clamp the nipple 4 firmly against the bottom surface 15 of the fitting 8 and to produce a fluid pressure tight seal between the outer edge of the head 7 of the nipple 4 and the internal bore 9 of the tubular extension 10 of the fitting 8. An angle C is applied to that part of the surface of the die 18 that lies opposite the grooves 13 of the tubular extension 10. This angle C is quite small generally and is used since it has been found that a better gripping action between the hose 1 and the fitting 8 is provided. An angle D is provided on the right end of the die 18 as shown so that the open end of the tubular extension 10 of the fitting 8 can be held in a restrained position to prevent an increased diameter of said open end which would put the fitting material adjacent the end thereof in tension with resultant longitudinal cracking or splitting unless special highly ductile materials are used. It is to be noted that the angle E originally machined in the internal bore 9 of the fitting 8 (note dotted lines 12) is increased substantially to the value E' as the fitting 8 is formed onto the hose 1. Due to the restraint offered by the right end of the die 18 the mouth of the bore 9 of the fitting 8 is reduced in its mean diameter but is still larger than the outside diameter of the hose 1.

The ridges or ribs 21 appearing longitudinally along the outer surface of the fitting 8 after it has been applied to the hose 1 are the natural result of application of a multiplicity of jaws moving in a radial direction toward a common center to controllably force the entire tubular extension 10 to a smaller diameter.

The natural result of the forming action hereinbefore described is to increase the length of the part being formed.

A complete die assembly is shown in Figure 4. Dies 18 are oriented in slots 22 formed by guides 23 and are thereby constrained to move only in a radial direction. A ring 24 is connected individually to each die 18 by levers 25 by means of pins 26 and 27 so that when the ring 24 is rotated by a prime mover (not shown) a radial motion is imparted to the dies 18 thereby causing them to close and exert the necessary force upon the fitting 8 (see Figure 3) to produce the reducing action.

The process of applying the fitting 8 to the hose end 1 is as follows: The neck 5 of the nipple 4 is forced into the end of the bore of the hose 1 until the flanged end or head 7 of the nipple 4 is in contact therewith. This operation causes the exterior of the hose 1 extending from the end thereof back to the point 11 to become larger in diameter than the original outside diameter of the free hose. As stated before, the hose 1 is then ground to a diameter substantially equal to the diameter of the internal bore 9 of the tubular extension 10 of the fitting 8. This subassembly is then placed in said internal bore 9 with the head 7 of the nipple 4 in close contact with the bottom surface 15 of the fitting 8. The assembly is then placed in the forming machine and held in the position relative to the dies 18 shown in Figure 3. The ring 24, shown in Figure 4, is then rotated counterclockwise thus forcing the dies 18 radially inwardly by means of the pins 26 and 27 and the levers 25 and causing the faces 19 of the dies 18 to contact and form the fitting 8.

The point on the die designated by the number 28 is the first to contact the fitting. As the die 18 moves inwardly the point 28 thereon causes a reduction of diameter of the tubular extension 10 which tends to restrain the rubber compound 3 of the hose 1 from flowing out of the mouth of the tubular extension 10. As the die 18 progresses inwardly, a point 29 thereon contacts the outer surface of the tubular extension 10 and upon further movement deforms the metal of the wall of the extension 10 between this point and the bottom surface 15 of the fitting 8 in such a manner that the tubular extension 10 of the fitting 8 flows into contact with the edge of the nipple head 7 and slightly along the back 17 of the nipple head 7 opposite the bottom to form a pressure fluid tight seal between the two metallic surfaces.

That part of the die to the right of the point 28 as shown in Figure 3 causes the outer surface of the tubular extension 10 which lies thereunder to be reduced in diameter but due to the angle D machined on the face 19 of the die 18 the outer flare or angle E at the outer end of the extension 10 becomes more pronounced as shown by angle E'. However, this last mentioned flared portion and remaining portion of the sleeve 10 are somewhat longer than would otherwise be the case since there is a longitudinal flow of metal toward the right as shown in Figure 3. This flow of metal combined with the angular form D of the die 18 causes the angle E to be increased to E' which is greater than that which would be caused by the die face 19 alone. At the open end the tubular extension 10 must be materially larger in diameter than the outside diameter of the hose 1 to provide a substantial amount of support to that section of the hose which bends most sharply under extreme flexure conditions without causing cutting thereof. However, the outside diameter of the tubular extension 10 at the end thereof is less than before forming as can be seen by reference to the initial shape of said tubular extension 10 shown by the dotted lines 12 of Figure 3.

The use of this method of applying a hose fitting allows the fitting to be made of a material which is ordinarily considered as not particularly suitable for fittings with flared ends in that all metal is maintained under compression throughout the operation and thereafter thus removing the possibility of axial splitting due to the metal around the mouth of the fitting being in radial and circumferential tension.

This invention is intended to cover all changes and modifications of the example of the invention herein chosen for purposes of the disclosure, which do not constitute departures from the spirit and scope of the invention.

What we claim is:

1. The method of assembling and securing a fitting to a flexible hose member, said fitting being provided with an open ended tubular extension with an outwardly flared inner surface at its open end for receiving the end of said hose member and with the bore of said extension being substantially equal in diameter to the external diameter of said hose member, and a cylindrical shaped nipple concentric with the bore of said tubular extension and receivable in the end of said hose member, which method comprises deforming the outer surface of said tubular extension over its entire length radially inwardly in such a manner as to provide a greater inward deformation of said tubular extension near its center to thereby compress said hose member between said nipple and said tubular extension and to provide a clearance with the aid of the preformed flared inner surface of said tubular extension between said hose member and the end of said tubular extension, said open end portion of said tubular extension being deformed inwardly to a lesser extent than said center portion.

2. The method of assembling and securing a fitting to a flexible hose member, said fitting being provided with an open ended tubular extension having a cylindrical outer surface of uniform diameter and provided with an outwardly flared inner surface at its open end for receiving the end of said hose member and with the bore of said extension having an internal surface substantially equal in diameter to the external diameter of said hose member, and a cylindrical shaped nipple concentric with the bore of said tubular extension and receivable in the end of said hose member, which method comprises deforming the outer surface of said tubular extension over its entire length radially inwardly in such a manner as to provide a greater inward deformation of said tubular extension near its center to thereby compress said hose member between said nipple and said tubular extension and to provide a clearance with the aid of the preformed flared inner surface of said tubular extension between said hose member and the end of said tubular extension, said open end portion of said tubular extension being deformed inwardly to a lesser extent than said center portion and with said open end portion having a mean diameter less than the mean diameter of the inner end portion of said tubular extension.

3. The method of assembling and securing a fitting having a tubular extension at one end thereof to a flexible hose member comprising the steps of inserting a cylindrical shaped nipple in one end of the hose member, the nipple having a flange at the outward end thereof engaging the end of the hose member; inserting the hose member and nipple in the bore forming the tubular extension on the fitting, the flange on the nipple engaging the fitting at a point immediately adjacent the tubular extension; simultaneously deforming the midportion and the end portions of the tubular extension radially inwardly to compress the hose member between the nipple and the inner surface of the bore in the tubular extension and to place the flange of the nipple in a sealing relationship to the inner surface of the bore, the midportion of the tubular extension being deformed inwardly to a greater extent than the end portions to produce a flaring at the free end of the tubular extension.

4. The method of assembling and securing a fitting to a flexible hose member, wherein the fitting is provided with an open ended tubular extension having a cylindrical outer surface of uniform diameter and provided with an outwardly flared inner surface at its open end for receiving the end of said hose member, the bore of the tubular extension having an internal surface substantially equal in diameter to the external diameter of the hose member and a wall with a small passage therethrough terminating the inner end of said bore in the tubular extension, a cylindrical shaped nipple receivable in the open end of the hose member, said nipple being provided with an annular flange at one end thereof with a peripherial diameter less than the diameter of the bore and having one side engageable with the end of the hose member and a second side engageable with the wall in the tubular extension, which method comprises the steps of inserting the cylindrical shaped nipple in the end of the hose member placing the one side of the annular flange against the end of the hose member; inserting the nipple and hose member assembly into the tubular extension of the fitting, the second side of the annular flange on the nipple being forced into engagement with the wall at the inner end of the tubular extension; simultaneously deforming the midportion and the inner and outer end portions of the tubular extension radially inwardly to thereby compress the hose member between the nipple and the inner surface of the tubular extension and to place the flange of the nipple in sealing relationship with the tubular extension, the midportion of the tubular extension being deformed inwardly to a greater extent than the inner and outer end portions to increase the angle of flaring at the open end of the tubular extension.

References Cited in the file of this patent
UNITED STATES PATENTS

| | | |
|---|---|---|
| 1,761,521 | Eastman | June 3, 1930 |
| 1,954,989 | Eastman | Apr. 17, 1934 |
| 2,008,650 | Weatherhead | July 16, 1935 |
| 2,028,316 | Brunner | Jan. 21, 1936 |
| 2,031,824 | Eastman | Feb. 25, 1936 |
| 2,040,834 | Cowles | May 19, 1936 |
| 2,314,890 | Melsom | Mar. 30, 1943 |
| 2,453,997 | MacWilliam | Nov. 16, 1948 |